(12) United States Patent
Moon, Jr.

(10) Patent No.: US 11,400,488 B2
(45) Date of Patent: Aug. 2, 2022

(54) HIGH TEMPERATURE ULTRASONIC TRANSDUCERS AND SIGNAL CONNECTORS

(71) Applicant: AMETEK, INC., Berwyn, PA (US)

(72) Inventor: John Jeffery Moon, Jr., Broken Arrow, OK (US)

(73) Assignee: AMETEK, INC., Berwyn, PA (US)

( * ) Notice: Subject to any disclaimer, the term of this patent is extended or adjusted under 35 U.S.C. 154(b) by 277 days.

(21) Appl. No.: 16/286,716

(22) Filed: Feb. 27, 2019

(65) Prior Publication Data

US 2020/0269281 A1 Aug. 27, 2020

(51) Int. Cl.
| | |
|---|---|
| *H04B 11/00* | (2006.01) |
| *B06B 1/06* | (2006.01) |
| *B06B 1/02* | (2006.01) |
| *H04R 17/00* | (2006.01) |

(52) U.S. Cl.
CPC .......... *B06B 1/0655* (2013.01); *B06B 1/0292* (2013.01); *H04B 11/00* (2013.01); *H04R 17/00* (2013.01)

(58) Field of Classification Search
CPC ..... B06B 1/0655; B06B 1/0292; H04B 11/00; H04R 17/00
See application file for complete search history.

(56) References Cited

U.S. PATENT DOCUMENTS

| | | | |
|---|---|---|---|
| 9,082,952 B2* | 7/2015 | Clark | B06B 1/0637 |
| 2005/0183739 A1* | 8/2005 | McDermott | B08B 3/12 |
| | | | 134/1 |
| 2011/0162463 A1* | 7/2011 | Allen | G01F 1/662 |
| | | | 73/861.18 |
| 2014/0311833 A1* | 10/2014 | Martinotto | G01L 5/225 |
| | | | 188/1.11 E |

FOREIGN PATENT DOCUMENTS

| | | |
|---|---|---|
| EP | 2499683 A1 | 9/2012 |
| JP | 06327417 A | 11/1994 |

OTHER PUBLICATIONS

Partial International Search Report and Written Opinion for International Application No. PCT/US2020/018853, dated May 28, 2020 (May 28, 2020)—11 pages.

* cited by examiner

*Primary Examiner* — Isam A Alsomiri
*Assistant Examiner* — Abdallah Abulaban
(74) *Attorney, Agent, or Firm* — Culhane Meadows PLLC; Stephen J. Weed

(57) ABSTRACT

Pressure vessels that operate at elevated temperatures and pressures (e.g., 600° F./316° C., 20000 psig), and ultrasonic transducers and signal connectors for use therein, are described. The pressure vessels include a housing defining a cavity. The housing includes a cylindrical body with plugs positioned within openings of the cylindrical body. Each plug has a recess extending from an external surface to a location ultrasonically adjacent the cavity. The pressure vessels additionally include transducer assemblies positioned within respective plug recesses. Each transducer assembly includes a signal connector positioned within the recess adjacent the external surface, a transducer having a piezoceramic element positioned within the recess at the location ultrasonically adjacent the cavity, and a metallic interconnection spring interconnecting the transducer to the signal connector.

21 Claims, 4 Drawing Sheets

HIGH TEMPERATURE ULTRASONIC TRANSDUCERS AND SIGNAL CONNECTORS

TECHNICAL FIELD

The disclosed subject matter includes examples of ultrasonic transducers and signal connectors and, in particular, ultrasonic transducers, signal connectors, and systems for use in elevated temperature environments.

BACKGROUND

There is a need for ultrasonic transducers and signal connectors capable of operating at elevated temperatures. For example, ultrasonic transducers and signal connectors are needed for use in ultrasonic cement analyzers and gel strength analyzers to determine the sonic velocity of cement slurries and solid cement. In such analyzers, cement slurries are pressurized within a high-pressure, high-temperature pressure vessel used to simulate conditions in an oil and gas well (which can approach 600° F./316° C.). A transducer is typically mounted on the axis at each end of the pressure vessel. The transducer pair and suitable electronics and software measure the sonic velocity through the cement sample.

Conventional transducers and signal connectors designed for use in ultrasonic cement analyzers and gel strength analyzers are rated to a maximum temperature of 400° F./204° C. In order to test cement slurries at the higher temperatures that may be present in an oil and gas well, ultrasonic transducers and signal connectors capable of operating at those higher temperatures are need.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. The drawing figures depict one or more implementations, by way of example only, not by way of limitations. Included in the drawings are the following figures.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. It is important to understand that the invention is not limited in its application to the details of the construction illustrated and the steps described herein. The invention is capable of other embodiments and of being practiced or carried out in a variety of ways. It is to be understood that the phraseology and terminology employed herein is for description and not of limitation It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Figure 1:
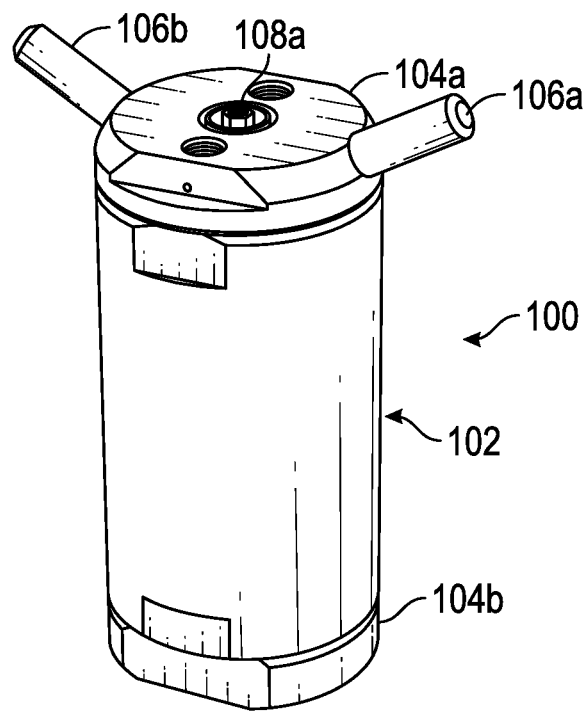
FIG. 1 is a perspective view of a pressure vessel assembly in accordance with aspects of examples described herein.

FIG. 1 depicts a pressure vessel assembly 100. The pressure vessel assembly 100 includes a cylindrical body 102 having a first opening and a second opening. A first plug 104a is positioned within the first opening and a second plug 104b is positioned within the second opening. The cylindrical body 102, the first plug 104a, and the second plug 104b form a housing defining a cavity 110 (FIG. 2) configured to receive a material for ultrasonic measurement, e.g., a cement slurry or solid cement. The first plug 104a and the second plug include threads that engage mating threads within the cylindrical body. A user may use handles 106a and 106b to position the pressure vessel assembly and to screw/unscrew the plugs 104 into/out of the cylindrical body 102. Signal connectors such as signal connector 108a provide for interconnection of external analysis equipment (not shown) to transducers positioned within pressure vessel assembly 100 for analysis of the material within the cavity 110 of the pressure vessel assembly 100.

Figure 2:
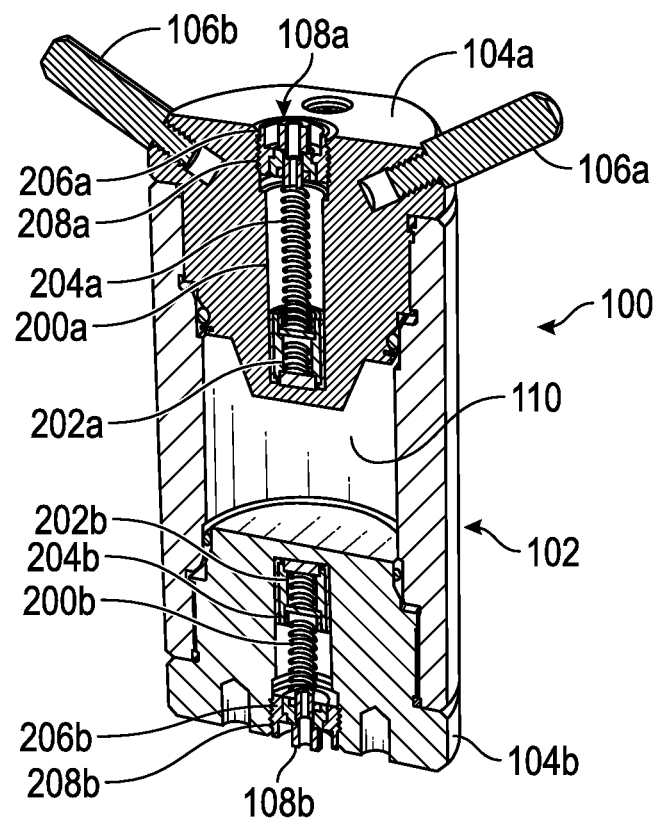
FIG. 2 is a cross-sectional view of the pressure vessel assembly of FIG. 1.
Figure 3:
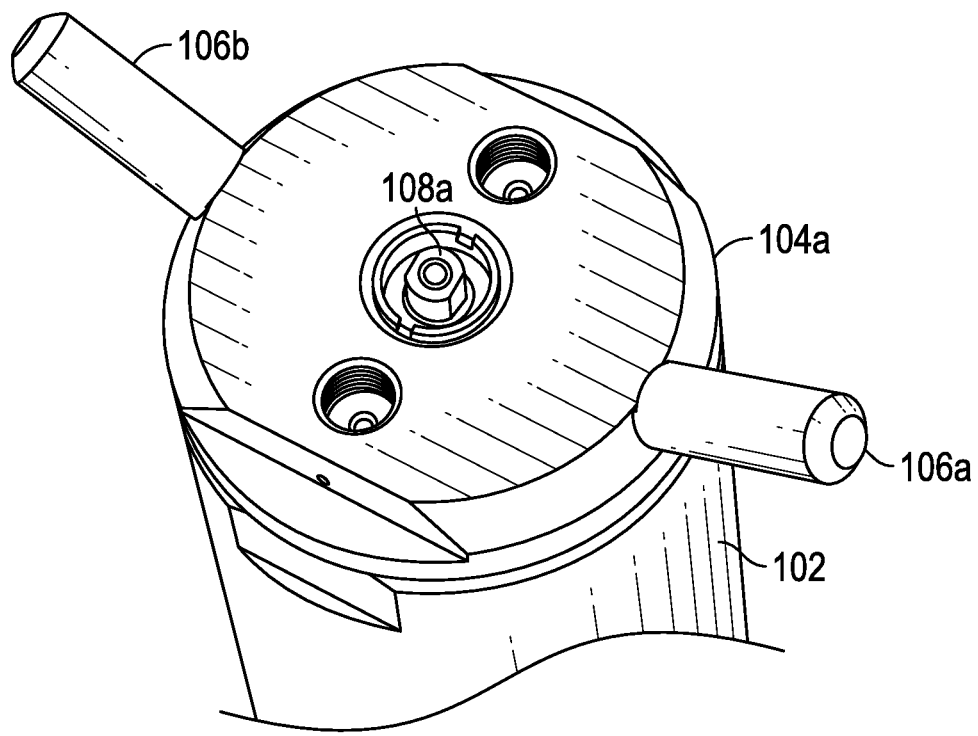
FIG. 3 is a top view of the pressure vessel assembly of FIG. 1.

FIG. 2 depicts a cross-section of the pressure vessel assembly 100 and FIG. 3 depicts a top view of the pressure vessel assembly 100. The first plug 104a and the second plug 104b each include a recess 200a and 200b, respectively, extending from an external surface of the respective first and second plugs 200a and 200b to a location ultrasonically adjacent the cavity 110. As used herein, the term ultrasonically adjacent is used to mean a location in the vicinity of the cavity 110 that permits accurate measurements within commercially acceptable standards by external analysis equipment coupled to a transducer within the pressure vessel assembly.

A first transducer assembly is positioned within the first recess 200a and a second transducer assembly is positioned within the second recess 200b. The first transducer assembly includes a first transducer 202a, the signal connector 108a, and a metallic interconnection spring 204a interconnecting the first transducer 202a and the signal connector 108a. The second transducer assembly includes a second transducer 202b, a signal connector 108b, and a metallic interconnection spring 204b interconnecting the first transducer 202b and the signal connector 108b. The metallic interconnection springs 204a eliminates a need for incompatible soldered connections.

The transducers 202 are dimensioned for stable insertion within the recesses 200 (e.g., the diameter of the transducer is approximately equal to the diameter of the recess, enabling the transducer to be slid into the recess while maintaining its orientation). The signal connectors 108 are likewise dimensioned for stable insertion. The first and second recesses 200a and 200b may each includes internal threads 206a and 206b, respectively, near the opening of the respective recess 200. The first and second signal connectors 108a and 108b may each include external threads 208a and 208b configured to mate with the internal threads 206a and 206b, respectively, to secure the respective transducer assembly within the recess 200 by screwing the signal connector 108 into the recess after insertion of the respective transducer 202, metallic interconnection spring 204, and signal connector 108 within the recess 200. In an example, the transducer 202, metallic interconnection spring 204, signal connector 108, and external threads 208 may be dimensioned and sized for insertion within a conventional plug 200 to enable retrofitting of conventional pressure vessel assemblies for use at elevated temperatures, e.g., at or above 600° F./316° C.

The metallic interconnection spring 204a may be a conventional resilient stainless-steel spring capable of operation for extended periods of time at elevated temperatures. The transducers 204 and signal connectors 108, which are also capable of operation at elevated temperatures, are described in greater detail below. In an example, the first and second transducer assemblies are the same. In other examples, the first and second transducers may be different.

Figure 4:
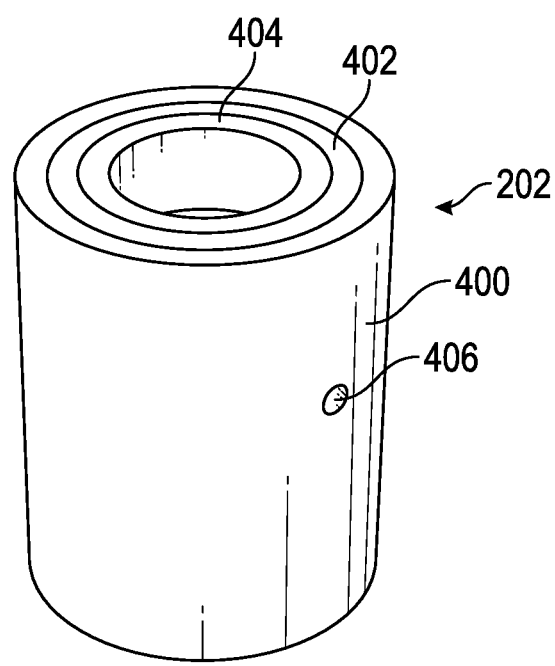
FIG. 4 is a perspective view of a transducer in accordance with aspects of examples described herein.

FIG. 4 depicts a top perspective view of the transducer 202. The transducer assembly 202a includes an outer metallic cylinder 400, an inner ceramic cylinder having a main body 402 and a ring 404. A vent hole 406 extends through the outer metallic cylinder 400 to vent gas due to pressure build up within the transducer 202 during operation at elevated temperatures. The main body 402 and the ring 404 may be formed from a machinable ceramic capable of operation at elevated temperatures such as Macor® available from Corning Incorporated of Corning, New York, USA. The outer metallic cylinder 400 may also be formed from a material capable of operating at an elevated temperature, e.g., stainless steel.

Figure 5:
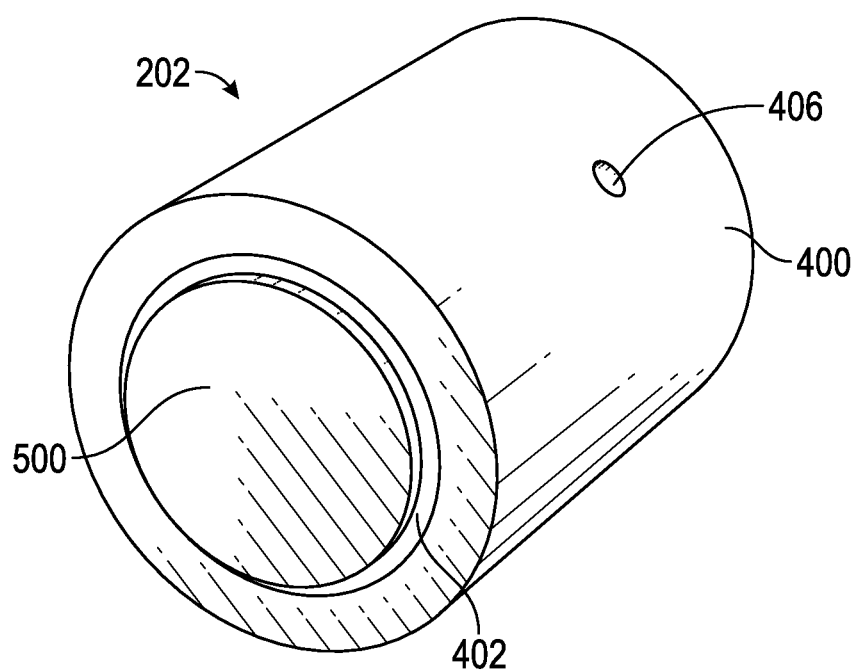
FIG. 5 is a bottom view of the transducer of FIG. 4.

FIG. 5 depicts a bottom view of the transducer 202. The transducer pair 202a and 202b include a piezoceramic element 500 for transmitting and receiving sound through the pressure vessel assembly and sample within the pressure vessel assembly 100. The piezoceramic element 500 may be formed from a material that can withstand operation at an elevated temperature. A suitable piezoceramic element is Modified Lead Metaniobate or Modified Lead Zirconate Titanate. The piezoceramic element used within the transducer should be compatible with continuous elevated temperature exposure while providing adequate signal characteristics. Other suitable piezoceramic elements will be understood by one of skill in the art from the description herein.

Figure 6:
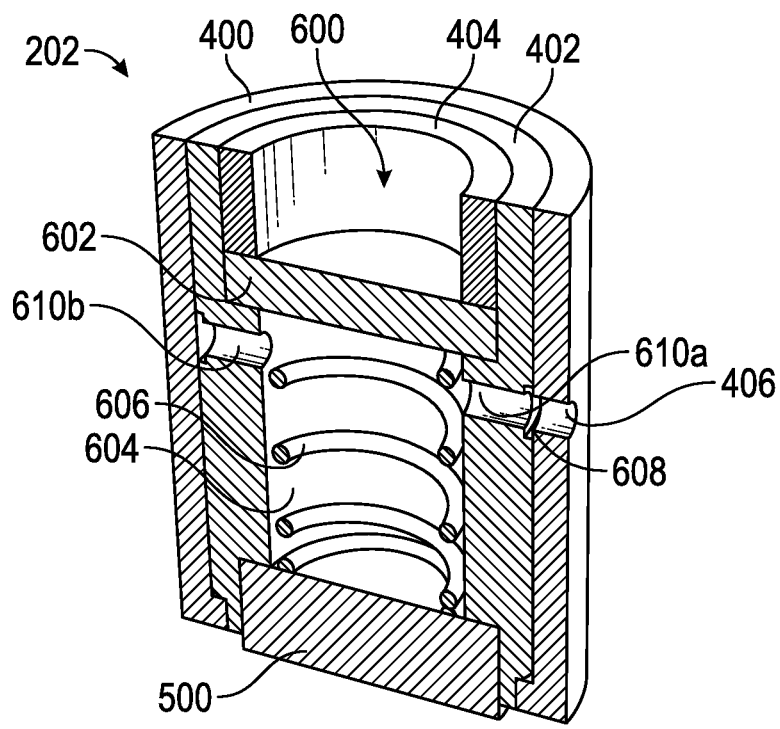
FIG. 6 is a cross-sectional view of the transducer of FIG. 4.

FIG. 6 depicts a cross-sectional view of the transducer 202. The main body 402 of the transducer 202 is positioned within the outer metallic cylinder 400. The main body 402 and the ring 404 (forming the inner ceramic cylinder) define a cylindrical passage 600, with the inner ceramic cylinder supporting the piezoceramic element 500 at one end of the cylindrical passage 600 and a metallic contact disk 602 at the other end of the cylindrical passage 600. The metallic contact disk 602 has a first surface and a second surface opposite the first surface. The first surface of the metallic contact disk 602 is configured to engage the metallic interconnection spring 204.

The inner ceramic cylinder, piezoceramic element 500, and metallic contact disk 600 define a cavity 604. An internal connection spring 606 positioned within the cylindrical passage 600/cavity 604 interconnect the piezoceramic element 500 to the second surface of the metallic contact disk 602. The metallic contact disk 600 and the internal connection spring 606 may be formed from a material capable of operating at an elevated temperature, e.g., stainless steel. The metallic internal connection spring 606 eliminates a need for incompatible soldered connections. Thus, transmit and receive signals that are a part of transducer operation may be connected to the piezoceramic element using metallic springs, and mating metallic components, eliminating a need for incompatible soldered connections.

The transducer 202 also includes an annular channel 608 in an outer surface of the inner ceramic cylinder (e.g., in the outer surface of the main body 402). A pair of boreholes 610a and 610b extend through the inner ceramic cylinder (e.g., through the main body 402) from the cylindrical passage 600 between the metallic contact disk 602 and the piezoceramic element 500 to the annular channel 608. The vent hole 406 may be adjacent one of the boreholes 610 when the main body 402 is surrounded by the outer metallic cylinder 400, however, due to the annular channel 608, the vent hole 406 may be offset rotationally with respect to the boreholes 610 about the longitudinal axis of the cylindrical passage 600 and still provide ventilation. The annular channel 608 may additionally have a width that is wider than the diameter of the borehole 610 and/or the vent hole 406 to accommodate an offset in the axial direction between the outer metallic cylinder 400 and the main body 402.

The metallic contact disk 600 has a first diameter and the internal connection spring 606 has a second diameter. The ring 404 has an outer dimension equal to the first diameter and an inner dimension equal to the second diameter. The main body 402 supports the piezoceramic element 500. The main body 402 has a first inner diameter in a first portion equal to the second diameter of the internal connection spring 606 and a second inner diameter in a second portion equal to the first diameter of the metallic contact disk 600. The second portion of the of the main body 402 is configured to support the metallic contact disk 602 and the ring 404.

To affix the elements of the transducer 202 to one another, a high temperature epoxy may be present between the ring 404 and the main body 402, between the piezoceramic element 500 and the main body 402, and between the main body 402 and the outer metallic cylinder 400. A high temperature epoxy may also be present between the metallic contact disk 600 and the main body 402. A suitable epoxy is Duralco™ 4703 available from Cotronics Corp. of Brooklyn, N.Y., USA, which is capable of withstanding elevated operating temperatures. Other suitable epoxies will be understood by one of skill in the art from the description herein.

Figure 7:
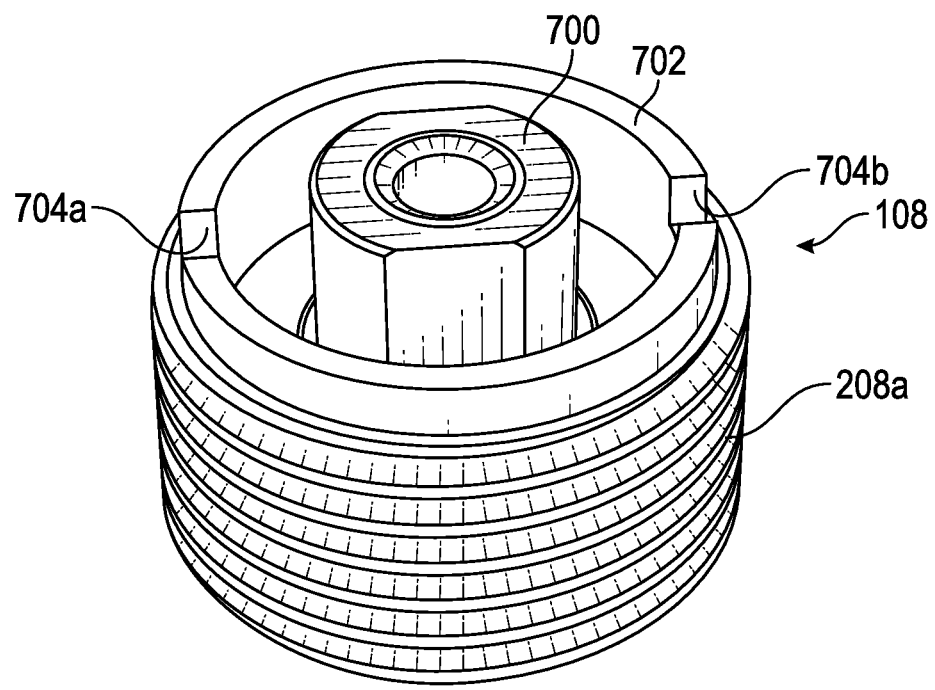
FIG. 7 is a perspective view of a signal connector in accordance with aspects of examples described herein.
Figure 8:
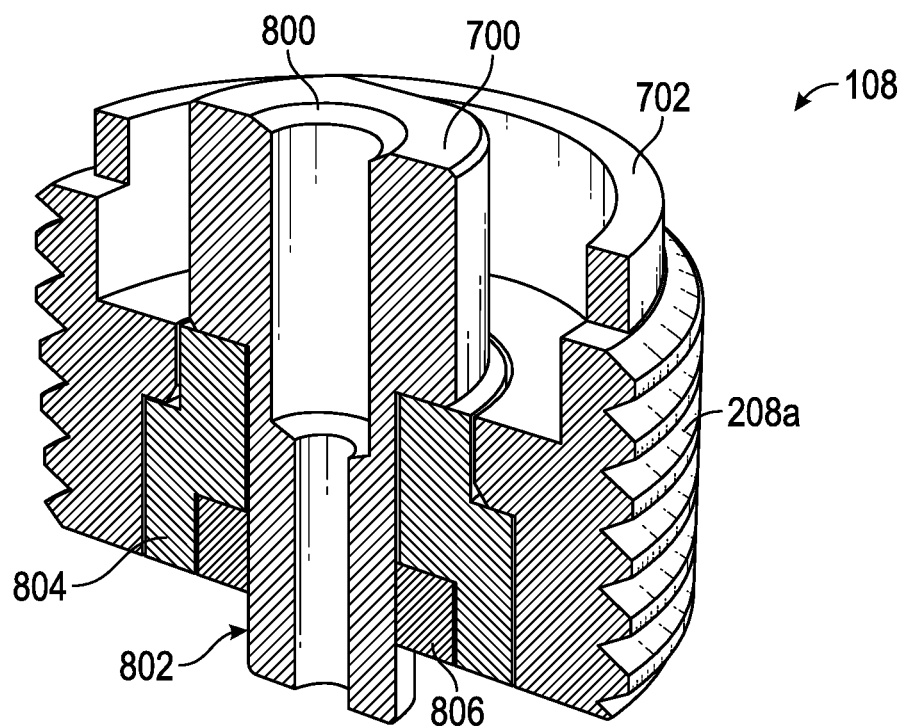
FIG. 8 is a cross-sectional view of the signal connector of FIG. 7.

FIG. 7 depicts a top perspective view of the signal connector 108 and FIG. 8 depicts a cross-sectional view of the signal connector 108. The signal connector 108 includes an inner connection element 700, an outer engagement element 702, a ceramic insulator 804 (FIG. 8) positioned between the inner connection element 700 and the outer engagement element 702, and a metallic ring 806 securing the ceramic insulator 804 to the inner connection element 700. The ceramic insulator 804 may be formed from a machinable ceramic capable of operation at elevated temperatures such as Macor®. The inner connection element 700 and the outer engagement element 702 may also be formed from a material capable of operating at an elevated temperature, e.g., stainless steel.

The inner connection element 700 may include a banana socket 800 accessible on an external surface of the signal connector 108 when positioned within the recess 200 of a plug 104. The banana socket 800 is configured to receive a banana plug connected to measurement equipment. The inner connection element 700 additionally includes a protrusion 802 on a second end adapted to engage a metallic interconnection spring 204 (FIG. 2).

The outer engagement element 702 is adapted to engage the recess 200 of a plug 104. In one example, the plug 104 has internal threads 206a and the outer engagement element 702 has mating threads 208a positioned to mate with the internal threads 206a of the plug 104 to secure the signal connector 108 (and other components of the transducer assembly 202) within the recess 200. The outer engagement element 702 may include a pair of slots 704a and 704b for use in screwing the signal connector 108 into the recess 200. In another example, a metallic retaining clip (not shown) may be used to secure the signal connector 108 (and other components of the transducer assembly 202) within the recess 200. In an example, the signal connector 108 (and other components of the transducer assembly 202) is removable from the pressure vessel for repair or replacement.

To affix the elements of the signal connector 108 to one another, a high temperature epoxy may be present between the outer engagement element 702 and the ceramic insulator 804 and between the ceramic insulator 804 and the inner connection element 700. The high temperature epoxy may be the same or similar to the high temperature epoxy described above with respect to the transducer 202.

The transducer 202 may be produced by inserting the metallic contact disk 602 followed by the ring 404 into one end of the main body 402 and inserting the internal connection spring 606 followed by the piezoelectric element 500 into the other end of the main body 402 to produce an internal assembly. The internal assembly may then be positioned within the outer metallic cylinder 400. High temperature epoxy is coated on one or more of the adjacent surfaces prior to insertion and positioning. The assembly is clamped axially until the epoxy has solidified. In an example, the transducer 202 is produced in a vacuum chamber where the assembly is heated to remove air bubbles and set the epoxy.

The signal connector 108 may be produced by positioning the ceramic insulator 804 on the inner connection element 700 and, then, positioning the ring 806 on the inner connection element 700 to form an internal assembly. The internal assembly can then be positioned within the outer engagement element 702. High temperature epoxy is coated on one or more of the adjacent surfaces prior to positioning. The assembly is clamped axially until the epoxy has solidified. In an example, the signal connector 108 is produced in a vacuum chamber where the assembly is heated to remove air bubbles and set the epoxy.

In one example use, a high temperature ultrasonic transducer pair and signal connectors are used within an ultrasonic cement analyzer or gel strength analyzer to determine the sonic velocity of cement slurries and solid cement. The cement slurry is contained within a pressure vessel and plug assembly. Due to the containment, the cement slurry may be heated and pressurized as a part of simulating conditions in an oil or gas well. As the cement slurry is heated and pressurized, the sonic velocity and signal attenuation are determined periodically. The resulting data may be used to predict the compressive strength of the cement and the rate of development of gel strength.

A transducer in accordance with one or more examples described herein is mounted on the axis at each end of the pressure vessel. The transducer pair and suitable electronics and software are configured to measure the sonic velocity through the cement sample at elevated temperatures (e.g., 600° F./316° C.) and elevated pressures (e.g., 20000 psig). Aspects of the transducer assemblies described herein are capable of operating at elevated temperatures when compared to existing methods that are limited to 400° F./204° C.

Additionally, transducer assemblies described herein may be configured to be retrofit into conventional ultrasonic cement analyzers or gel strength analyzers in order to replace lower temperature-rated transducer assemblies— thereby increasing the temperature rating of the ultrasonic cement analyzers or gel strength analyzers.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

Although an overview of the inventive subject matter has been described with reference to specific examples, various modifications and changes may be made to these examples without departing from the broader scope of examples of the present disclosure. Such examples of the inventive subject matter may be referred to herein, individually or collectively, by the term "invention" merely for convenience and without intending to voluntarily limit the scope of this application to any single disclosure or inventive concept if more than one is, in fact, disclosed.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A pressure vessel assembly comprising:
   a housing defining a cavity, the housing including a cylindrical body having a first opening and a second opening, a first plug positioned within the first opening, and a second plug positioned within the second opening, each plug having a respective recess extending from an external surface of the housing to a location ultrasonically adjacent the cavity, wherein the the second recesses do not extend to the cavity;

a pair of transducer assemblies, each transducer assembly positioned within the respective recess of the first or second plugs, wherein the first and second recesses do not extend to the cavity and wherein the pair of transducer assemblies are so spaced from the cavity, each transducer assembly including;

a signal connector positioned within the recess adjacent the external surface of the housing, a transducer having a piezoceramic element positioned within the recess at the location ultrasonically adjacent the cavity, and a metallic interconnection spring interconnecting the transducer to the signal connector to pass transducer signals between the transducer and the signal connector.

2. The pressure vessel assembly of claim 1, wherein the piezoceramic element is modified lead metaniobate or modified lead zirconate titanate.

3. The pressure vessel assembly of claim 1, wherein each transducer further comprises:

a metallic contact disk having a first surface and a second surface, the first surface configured to engage the metallic interconnection spring, an inner ceramic cylinder defining a cylindrical passage, the inner ceramic cylinder supporting the piezoceramic element at one end of the cylindrical passage and the metallic contact disk at the other end of the cylindrical passage;

an internal connection spring positioned within the cylindrical passage and interconnecting the piezoceramic element to the second surface of the metallic contact disk; and an outer metallic cylinder adjacent an outer surface of the inner ceramic cylinder.

4. The pressure vessel assembly of claim 3, wherein the transducer further comprises:

an annular channel in the outer surface of the inner ceramic cylinder;

a borehole extending through the inner ceramic cylinder from the cylindrical passage between the metallic contact disk and the piezoceramic element to the annular channel; and a vent hole extending through the outer metallic cylinder, the vent hole positioned adjacent the annular channel when the inner ceramic cylinder is surrounded by the outer metallic cylinder.

5. The pressure vessel assembly of claim 3, wherein the metallic contact disk has a first diameter, the internal connection spring has a second diameter, and the inner ceramic cylinder comprises:

a ring having an outer dimension equal to the first diameter and an inner dimension equal to the second diameter; and a main body that supports the piezoceramic element, the main body having a first inner diameter equal to the second diameter in a first portion and a second inner diameter equal to the first diameter in a second portion, the second portion configured to support the metallic contact disk and the ring.

6. The pressure vessel assembly of claim 5, further comprising high temperature epoxy between the ring and the main body, between the piezoceramic element and the main body, and between the main body and the outer metallic cylinder.

7. The pressure vessel assembly of claim 3, wherein each signal connector comprises:

an inner connection element;

an outer engagement element adapted to engage the recess of the respective one of the first or second plugs; and a ceramic insulator positioned between the inner connection element and the outer engagement element.

8. The pressure vessel assembly of claim 7, wherein the inner connection element has a banana socket on a first end and a protrusion on a second end adapted to engage the metallic interconnection spring.

9. The pressure vessel assembly of claim 7, wherein the recess of the respective one of the first or second plugs has threads and the outer engagement element has mating threads positioned to mate with the threads of the respective one of the first or second plugs to secure the transducer assembly within the respective one of the first or second plugs.

10. The pressure vessel assembly of claim 7, further comprising high temperature epoxy between the inner connection element and the ceramic insulator and between the outer engagement element and the ceramic insulator.

11. A transducer assembly comprising:

a signal connector, a transducer having a piezoceramic element, and a metallic interconnection spring interconnecting the transducer to the signal connector to pass transducer signals between the transducer and the signal connector, wherein the transducer further comprises:

a metallic contact disk having a first surface and a second surface, the first surface configured to engage the metallic interconnection spring, an inner ceramic cylinder defining a cylindrical passage, the inner ceramic cylinder supporting the piezoceramic element at one end of the cylindrical passage and the metallic contact disk at the other end of the cylindrical passage;

an internal connection spring positioned within the cylindrical passage and interconnecting the piezoceramic element to the second surface of the metallic contact disk; and an outer metallic cylinder adjacent an outer surface of the inner ceramic cylinder.

12. The transducer assembly of claim 11, wherein the piezoceramic element is modified lead metaniobate or modified lead zirconate titanate.

13. The transducer assembly of claim 11, wherein the transducer further comprises:

an annular channel in the outer surface of the inner ceramic cylinder;

a borehole extending through the inner ceramic cylinder from the cylindrical passage between the metallic contact disk and the piezoceramic element to the annular channel; and a vent hole extending through the outer metallic cylinder, the vent hole positioned adjacent the annular channel when the inner ceramic cylinder is surrounded by the outer metallic cylinder.

14. The transducer assembly of claim 13, wherein the metallic contact disk has a first diameter, the internal connection spring has a second diameter, and the inner ceramic cylinder comprises:

a ring having an outer dimension equal to the first diameter and an inner dimension equal to the second diameter; and a main body that supports the piezoceramic element, the main body having a first inner diameter equal to the second diameter in a first portion and a second inner diameter equal to the first diameter in a second portion, the second portion supporting the metallic contact disk and the ring.

15. The transducer assembly of claim 14, further comprising high temperature epoxy between the ring and the main body, between the piezoceramic element and the main body, and between the main body and the outer metallic cylinder.

16. The transducer assembly of claim 13, wherein the signal connector comprises:

an inner connection element;

an outer engagement element adapted to engage the recess of the respective one of the first or second plugs; and a ceramic insulator positioned between the inner connection element and the outer engagement element.

17. The transducer assembly of claim 16, wherein the inner connection element has a banana socket on a first end and a protrusion on a second end adapted to engage the metallic interconnection spring.

18. A transducer comprising:

a piezoceramic element;

a metallic contact disk having a first surface and a second surface;

an inner ceramic cylinder defining a cylindrical passage, the inner ceramic cylinder supporting the piezoceramic element at one end of the cylindrical passage and the metallic contact disk at the other end of the cylindrical passage;

an internal connection spring positioned within the cylindrical passage and interconnecting the piezoceramic element to the second surface of the metallic contact disk to pass transmit and receive signals between the piezoceramic element and the metallic contact disk;

an outer metallic cylinder adjacent an outer surface of the inner ceramic cylinder; an annular channel in the outer surface of the inner ceramic cylinder;

a borehole extending through the inner ceramic cylinder from the cylindrical passage between the metallic contact disk and the piezoceramic element to the annular channel; and a vent hole extending through the outer metallic cylinder, the vent hole positioned adjacent the annular channel when the inner ceramic cylinder is surrounded by the outer metallic cylinder.

19. The transducer of claim 18, wherein the piezoceramic element is modified lead metaniobate or modified lead zirconate titanate.

20. The transducer of claim 18, wherein the metallic contact disk has a first diameter, the internal connection spring has a second diameter, and the inner ceramic cylinder comprises:

a ring having an outer dimension equal to the first diameter and an inner dimension equal to the second diameter; and a main body that supports the piezoceramic element, the main body having a first inner diameter equal to the second diameter in a first portion and a second inner diameter equal to the first diameter in a second portion, the second portion supporting the metallic contact disk and the ring.

21. The transducer of claim 20, further comprising high temperature epoxy between the ring and the main body, between the piezoceramic element and the main body, and between the main body and the outer metallic cylinder.

* * * * *